3,159,676
NAPHTHYL CONTAINING GUANIDINES
Robert Geoffrey William Spickett, Harpenden, Graham John Durant, Welwyn Garden City, and Patrick Michael Guy Bavin, Letchworth, England, assignors to Smith Kline & French Laboratories, Philadelphia, Pa., a corporation of Pennsylvania
No Drawing. Filed Feb. 7, 1962, Ser. No. 171,593
5 Claims. (Cl. 260—564)

This invention relates to novel guanidine derivatives containing a naphthyl moiety. The compounds of this invention have pharmacological activity, in particular sympathetic nervous system blocking and hypotensive activity. In adition compounds of this invention have diuretic and antibacterial activity.

The novel guanidine derivatives of this invention are represented by the following structural formula:

Formula I

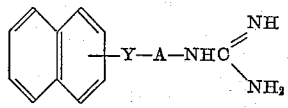

when:
Y is O, S or NR;
A is an alkylene chain of 2 to 4 carbon atoms having at least 2 carbon atoms separating the hetero atoms to which it is attached; and
R is hydrogen or lower alkyl.

Optionally the naphthyl nucleus of the compounds of Formula I may have inert substituents such as lower alkyl, lower alkoxy or halogen.

Advantageous compounds of this invention are those of Formula I in which Y is oxygen.

A prefered compound of this invention is 2-(1-naphthyloxy)ethylguanidine.

The term "lower alkyl" where used herein denotes groups having 1 to 3 carbon atoms, preferably methyl.

This invention also includes pharmaceutically acceptable salts of the above defined bases formed with nontoxic organic or inorganic acids. Suitable organic acids are, for example, maleic, fumaric, ascorbic, acetic, citric, methane sulfonic, ethane disulfonic and benzene sulfonic. Exemplary of the prefered inorganic salts are those with hydrochloric, hydrobromic, hydriodic, phosphoric and sulfuric acids. The compounds of this invention can be isolated as their inorganic salts. A salt can be converted into the free base by treatment of a solution of the salt in ethanol with a base such as sodium ethoxide. The free base can be converted into other pharmaceutically acceptable, nontoxic, acid addition salts by treating with the appropriate organic or inorganic acid advantageously in a solvent such as ethanol, ether or acetone.

The guanidine derivatives of this invention are prepared according to the following procedure:

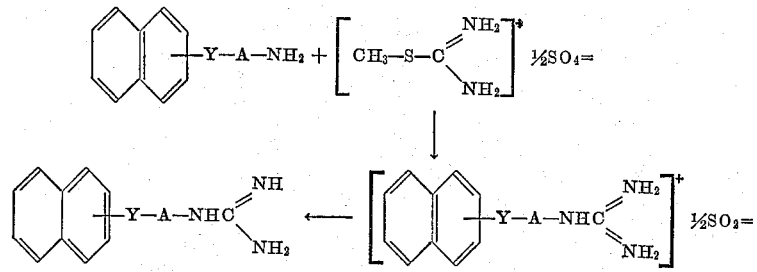

The terms Y and A are as defined hereabove.
The naphthyloxy-, naphthylthio- and naphthylaminoalkylamine starting material is reacted with S-methyl thiourea in the form of a mineral acid salt such as, preferably, the sulfate salt. The reaction is conveniently carried out in water or in aqueous alkanol, for example ethanol or methanol, at elevated temperature such as at the reflux temperature of the reaction mixture for from about 1 to 24 hours preferably from about 2 to 6 hours. The sulfate salt of the guanidine is isolated and converted to the free base by treatment with a base such as sodium ethoxide in ethanol as described hereabove.

The alkylamine starting materials are either known to the art or are prepared by reacting the appropriate naphthol, thionaphthol or naphthylamine with chloroacetonitrile in the presence of a base such as an alkali metal carbonate preferably potassium carbonate, sodium hydride or a tri-lower alkylamine such as triethylamine. The resulting cyanomethyl compound is reduced with lithium aluminum hydride to give the desired amine.

Alternatively the amine starting materials are prepared by reacting the naphthol, thionaphthol or naphthylamine with an alkylene dihalide followed by treatment with potassium phthalimide. The phthalimido derivative yields the amine starting material upon treatment with hydrazine.

The following examples are not limiting but are illustrative of the compounds of this invention and the processes for their preparation.

Example 1

To 8.5 g. of S-methyl thiouronium sulfate in 100 ml. of water is added 11.0 g. of 2-(1-naphthyloxy)ethylamine. The mixture is heated at reflux for two hours, then is allowed to cool to room temperature. The solid which separates is filtered, washed with cold water, dried and recrystallized from methanol-isopropanol to give 2-(1-naphthyloxy)ethylguanidine sulfate, M.P. 240–242° C.

The free base is obtained by dissolving the sulfate salt in aqueous ethanol, adding sodium ethoxide, filtering and evaporating.

Example 2

By the procedure of Example 1, 11.0 g. of 2-(2-naphthyloxy)ethylamine is reacted with 8.5 g. of S-methyl thiouronium sulfate in aqueous solution. The product is 2-(2-naphthyloxy)ethylguanidine sulfate, M.P. 245–247° C.

An ethanol solution of the sulfate salt is treated with a solution of sodium ethoxide in ethanol. Filtration and evaporation gives 2-(2-naphthyloxy)ethylguanidine.

Example 3

1-naphthol (28.8 g.), potassium carbonate (26 g.) and methyl ethyl ketone (60 ml.) are refluxed with stirring. To the mixture is added 34.5 g. of a-bromopropionitrile in 30 ml. of methyl ethyl ketone. The mixture is refluxed for four hours, then concentrated in vacuo. The residue is diluted with water and extracted with ether. The ether extracts are washed with 20% sodium hydroxide solution and water and dried over anhydrous potassium carbonate. Removing the ether and distilling the residue gives 2-(1-naphthyloxy)propionitrile.

The nitrile (16 g.) is dissolved in dry ether (100 ml.)

and added to lithium aluminum hydride (4 g.) in dry ether (200 ml.). The mixture is refluxed for one hour, then cooled and treated with wet ether and water. Extraction into hydrochloric acid, washing the extracts with petroleum ether, neutralizing with 20% sodium hydroxide, extracting with ether and concentrating and distilling the ether extracts affords 2-(1-naphthyloxy)propylamine.

A mixture of 19.8 g. of 2-(1-naphthyloxy)propylamine and 14.0 g. of S-methyl thiouronium sulfate in water is refluxed for two hours, then cooled and the solid which precipitates is collected and recrystallized from isopropanol methanol to yield 2-(1-naphthyloxy)propylguanidine sulfate.

The free base is obtained by treating an ethanol solution of the salt with a small excess of sodium ethoxide, filtering and concentrating.

Treating a sample of 2-(1-naphthyloxy)propylguanidine with an equimolar amount of maleic acid in ethanol gives, after evaporation of the solvent, 2-(1-naphthyloxy)propylguanidine maleate.

Example 4

A mixture of 28.8 g. of 1-naphthol, 100 g. of potassium carbonate and 300 ml. of methyl ethyl ketone is refluxed during the addition of 150 g. of 1-bromo-3-chloropropane. The resulting mixture is refluxed for 48 hours, cooled, filtered and concentrated in vacuo. The residue is diluted with water and extracted with ether. The extracts are washed with 10% caustic soda solution and water and then dried over potassium carbonate. Evaporation of the ether and distillation of the residue gives 1-chloro-3-(1-naphthyloxy)propane.

A solution of 20 g. of 1-chloro-3-(1-naphthyloxy)propane, 18 g. of potassium phthalimide and 50 ml. of dimethylformamide is heated at 120° C. for two hours. The mixture is poured into ice water. The solid which forms is collected, washed with water and dried to give 3-(1-naphthyloxy)propyl phthalimide.

This phthalimido compound (15.0 g.) is dissolved in ethanol and treated with 10 ml. of hydrazine hydrate. The solution is heated on the steam bath for 30 minutes, then filtered. The filtrates are concentrated in vacuo to give 3-(1-naphthyloxy)propylamine.

By the procedure of Example 1, 8.5 g. of S-methyl thiouronium sulfate is reacted with 12.0 g. of 3-(1-naphthyloxy)propylamine to give 3-(1-naphthyloxy)propylguanidine sulfate.

Example 5

By the procedure of Example 4, 2-naphthol is reacted with 1-bromo-4-chlorobutane to give 1-chloro-4-(2-naphthyloxy)butane which is refluxed in dimethylformamide with potassium phthalimide to yield 4-(2-naphthyloxy)butylphthalimide.

This phthalimido compound is heated with hydrazine in ethanol to give 4-(2-naphthyloxy)butylamine.

Ten grams of 4-(2-naphthyloxy)butylamine is added to an aqueous ethanol solution of S-methyl thiouronium sulfate (7.0 g.). Refluxing the mixture for three hours and working up as in Example 1 gives 4-(2-naphthyloxy)butylguanidine sulfate.

The sulfate salt is dissolved in ethanol and treated with sodium ethoxide to give, after filtering and evaporation, 4-(2-naphthyloxy)butylguanidine.

The free base in ethanol is treated with excess hydrogen chloride in ether to give 4-(2-naphthyloxy)butylguanidine hydrochloride.

Example 6

Chloroacetonitrile (50 ml.) is added to a refluxing methyl ethyl ketone solution of 2-thionaphthol (32 g.) and anhydrous potassium carbonate (26 g.). The mixture is refluxed for three hours and worked up as in example 3 to give 2-naphthylthioacetonitrile.

Reduction of this nitrile is accomplished with lithium aluminum hydride in dry ether to give 2-(2-naphthylthio)ethylamine.

An aqueous solution of 7.0 g. of S-methyl thiouronium sulfate and 10.0 g. of 2-(2-naphthylthio)ethylamine is refluxed for two hours. Cooling and filtering gives 2-(2-naphthylthio)ethylguanidine sulfate.

Similarly using 32.0 g. of 1-thionaphthol in the above procedure furnishes 2-(1-naphthylthio)ethylguanidine sulfate.

Example 7

A mixture of 10.0 g. of N-methyl-N-(1-naphthyl)ethylenediamine (prepared by reacting N-methyl-1-naphthylamine with chloroacetonitrile and reducing the resulting nitrile with lithium aluminum hydride) and 7.0 g. of S-methyl thiouronium sulfate in water is heated at reflux for two hours. The solution is cooled and the solid product is collected by filtration and recrystallized from methanol-isopropanol to give 2-[N-methyl-N-(1-naphthyl)amino]ethylguanidine sulfate.

The sulfate salt in ethanol solution is treated with excess sodium ethoxide to give, upon concentrating and filtering, 2-[N-methyl-N-(1-naphthyl)amino]ethylguanidine.

Example 8

To an aqueous solution of 13.8 g. of S-methyl thiouronium sulfate is added 18.6 g. of N-(2-naphthyl)ethylenediamine. The resulting mixture is refluxed for two hours. Cooling, filtering and recrystallizing the solid product from methanol-isopropanol yields 2-[N-(2-naphthyl)amino]ethylguanidine sulfate.

Example 9

By the procedure of Example 3, N-butyl-1-naphthylamine is reacted with chloroacetonitrile and the product reduced to give N-butyl-N-(1-naphthyl)ethylenediamine.

Refluxing N-butyl-N-(1-naphthyl)ethylenediamine with a slight excess of S-methyl thiouronium sulfate in water gives 2-[N-butyl-N-(1-naphthyl)amino]ethylguanidine sulfate.

What is claimed is:

1. A chemical compound of the class consisting of a free base and its addition salts with pharmaceutically acceptable acids, said free base having the formula:

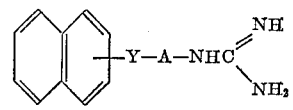

in which:

Y is a member selected from the group consisting of O, S and NR;

A is an alkylene chain of 2 to 4 carbon atoms having at least 2 carbon atoms separating the hetero atoms to which it is attached; and R is a member of the group consisting of hydrogen and lower alkyl.

2. A chemical compound of the formula:

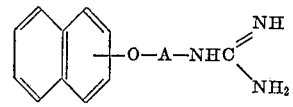

in which A is an alkylene chain of 2 to 4 carbon atoms having at least 2 carbon atoms separating the hetero atoms to which it is attached.

3. A chemical compound of the formula:

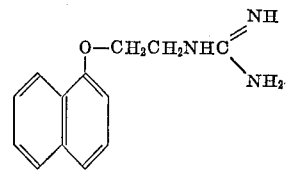

4. A chemical compound of the formula:

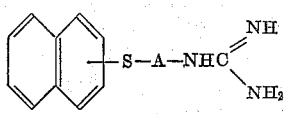

in which A is an alkylene chain of 2 to 4 carbon atoms having at least 2 carbon atoms separating the hetero atoms to which it is attached.

5. A chemical compound of the formula:

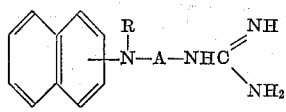

in which:
R is lower alkyl and
A is an alkylene chain of 2 to 4 carbon atoms having at least 2 carbon atoms separating the hetero atoms to which it is attached.

References Cited in the file of this patent

Kuroda: C. A., vol. 28, p. 7862 (1934).
Kuroda (II): C. A., vol. 29, p. 1504 (1935).
Baltzly et al.: J.A.C.S., vol. 64, pp. 2231–2332 (1942).
Conant et al.: "The Chemistry of Organic Compounds," 4th ed., p. 549 (1952).
Conant et al.: "The Chemistry of Organic Compounds," 4th ed., p. 335 (1952).
Shapiro et al.: J.A.C.S., vol. 81, pp. 3728–3736 (1959).
Mull et al.: J. Org. Chem., vol. 25, pp. 1953–1956 (1960).
Campbell: C.A., vol. 57, 16626 (1962).